July 7, 1964   E. K. DOMBECK   3,139,955
BAND-DISK BRAKE
Filed March 23, 1961   3 Sheets-Sheet 1
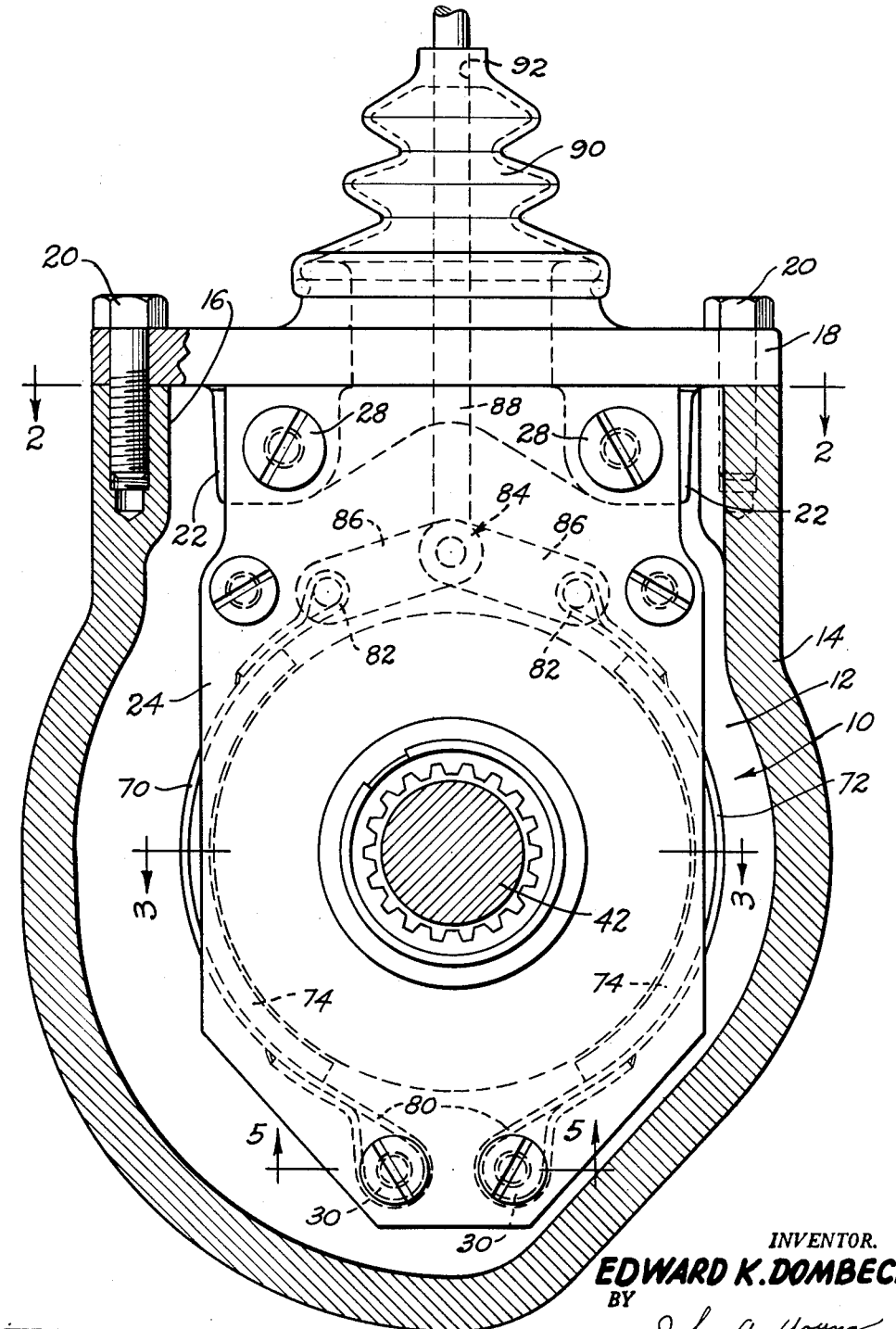
FIG_1
INVENTOR.
EDWARD K. DOMBECK.
BY John A. Young
ATTORNEY.

July 7, 1964  E. K. DOMBECK  3,139,955
BAND-DISK BRAKE
Filed March 23, 1961  3 Sheets-Sheet 2
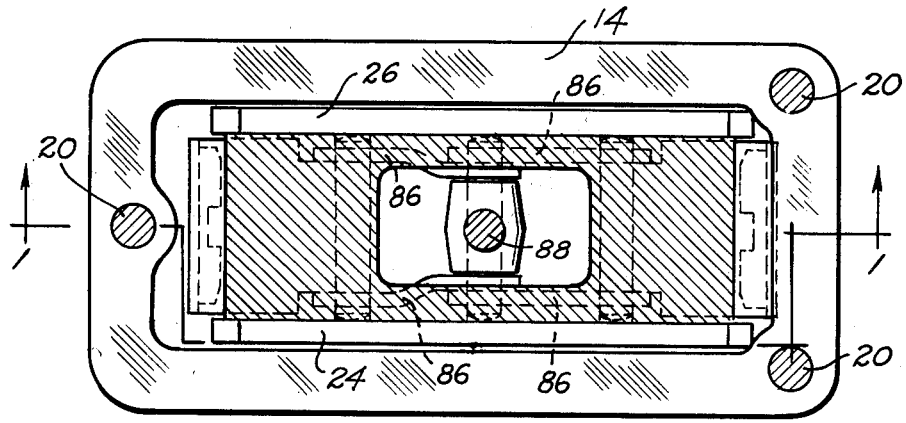
FIG_2
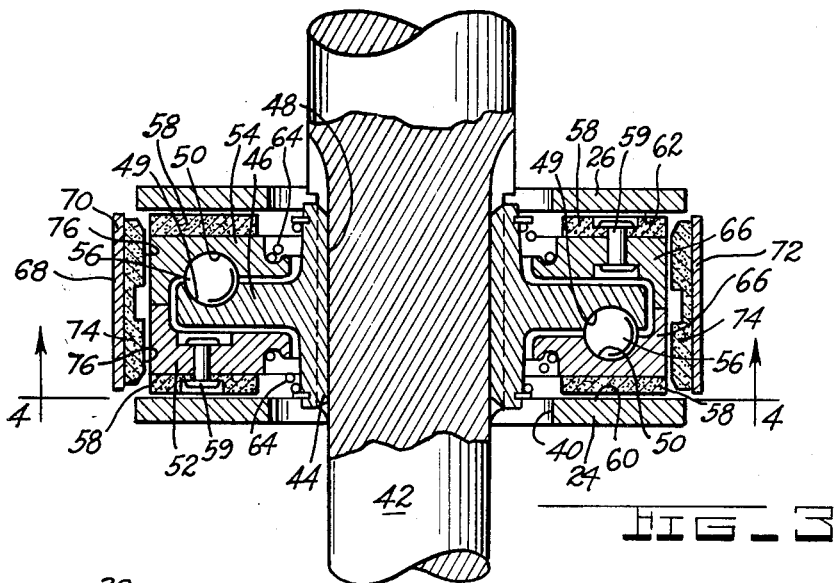
FIG_3
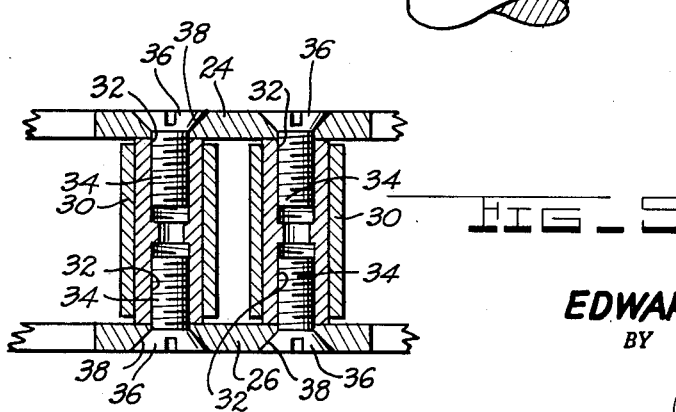
FIG_5
INVENTOR.
EDWARD K. DOMBECK
BY
*John A. Young*
ATTORNEY.

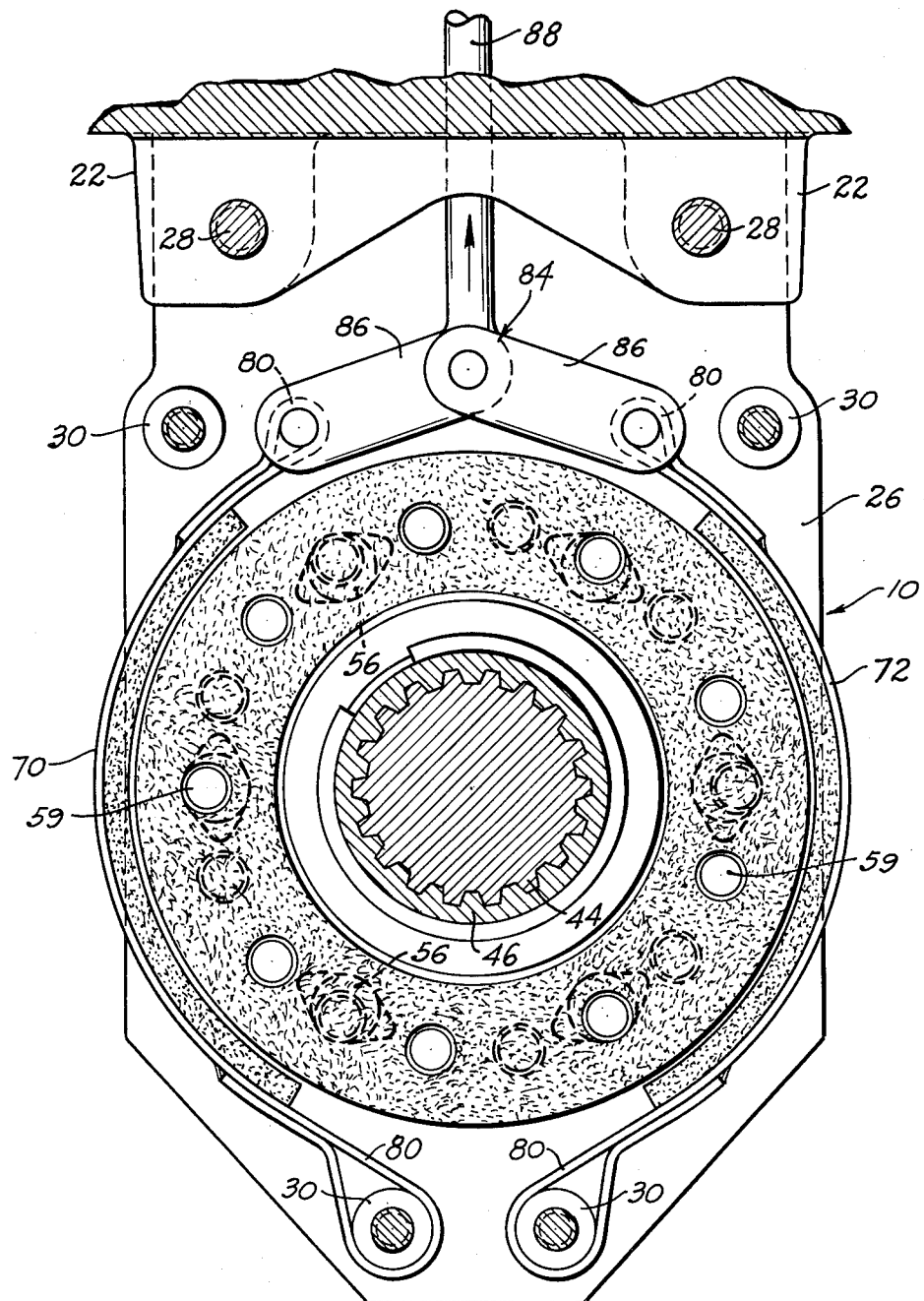

United States Patent Office 3,139,955
Patented July 7, 1964

3,139,955
BAND-DISK BRAKE
Edward K. Dombeck, South Bend, Ind., assignor to The Bendix Corporation, South Bend, Ind., a corporation of Delaware
Filed Mar. 23, 1961, Ser. No. 97,888
6 Claims. (Cl. 188—70)

This invention relates to brakes and more particularly to a brake which is a combination of both band and disk elements. The present invention was developed for tractor installations but its qualities make it equally useful for heavy duty braking applications in general such as found in trucks, off-the-road vehicles and the like and therefore reference to tractors, is illustrative but not restrictive of the invention.

In a tractor vehicle the torque requirements and the frequency of use are so combined that the shoe brake is taxed beyond its limits for many applications. For one thing, the tractor brakes are used extensively for steering the tractor during contour plowing; therefore the brakes are almost in constant use so that eventually the shoe brake will overheat and fade and in losing its effectiveness will be unable to provide enough braking torque.

The brake, constituting the present invention is shown installed on the jack shaft of the tractor because at this location the torque requirements of the brake are lower than is the case where the brake is disposed at the tractor wheels. Also, the jack shaft having heavy structural members, provides more efficient heat dissipation for the brakes since the adjoining heavy structural members serve as heat reservoirs for receiving the heat energy generated by the brake from the kinetic energy of the vehicle. Locating the brake at the jack shaft also tends to simplify the applying linkage and provides greater protection to the brake. It is an important feature however of the present invention that the brake is equally adaptable for installations at the jack shaft or at the wheels depending upon design preference. That is, the brake constituting the present invention can successfully meet the greater relative braking speeds and can sustain higher frequency of braking than can the shoe brake.

It is one of the objects of the present invention to provide a combination disk and band type brake wherein the braking is dissipated over a wide swept area to insure cooler operating temperatures and to effect this combination of band and disk braking by means of a novel combination of elements.

Another object of the invention is to provide a combination of disk and band type braking having the necessary effectiveness and torque capacity for braking the vehicle, these torque requirements being dictated by the location of the brake either at the jack shaft or wheels.

A further object of the invention is to obtain a combination band and disk brake which is of balanced force design i.e., the brake will not be as likely to produce objectionable surface noise during application or at the outset thereof from impingement of the brake parts against their opposing surface.

Another object of the invention is to provide a combination band and disk brake which can be readily serviced. Since all brakes are subject to wear and since the life of the lining material is less than the usable life of the vehicle, there must be from time-to-time servicing of the brake which consists essentially of replacing the lining or replacing components of the brake with new lining. This dictates that the brake must be accessible for removal and replacement when necessary.

Other objects and features of the present invention will become apparent from a consideration of the following description which proceeds with reference to the accompanying drawings wherein:

FIGURE 1 is a side elevation of the brake with a portion of the transmission case broken away to illustrate the brake parts more clearly. The view is taken on line 1—1 of FIGURE 2;

FIGURES 2 and 3 are section views taken on the respective section lines 2—2 and 3—3 of FIGURE 1;

FIGURE 4 is a section view taken on line 4—4 of FIGURE 3 illustrating the brake of FIGURE 1 with one of the braking surfaces of the disk removed; and FIGURE 5 is a section view taken on line 5—5 of FIGURE 1.

Referring now to the drawings, the brake designated generally by reference numeral 10 is located within a cavity 12 which is surrounded by transmission case 14 having an aperture 16 which is normally closed by a cover plate 18 secured to the transmission case by removable bolts 20. The cover plate 18 has depending lugs 22 which suspend two laterally spaced plates 24 and 26 through mounting bolts 28, the two plates being held in their proper spaced relation by means of sleeves 30 having internally threaded openings 32 (FIGURE 5) which receive machine screws 34 therein with flat heads 36 which fit within countersunk openings 38 of the plates 24, 26.

Each plate 24, 26 has an opening 40 to receive a jack shaft 42 therethrough which leads through a train of gears to a ground supporting wheel of the tractor. Holding the shaft 42 against rotation thereby prevents or retards rotation of the wheel of the tractor thus stopping the vehicle or slowing it as desired. The shaft 42 has splines 44 for rotating a drive member 46 having a hub 48 with splines dovetailing with the splines 44 of the shaft 42. Drive member 46 has at its opposite faces inclined spaced recess 49 which are complementary with inclined spaced opposed recesses 50 in annular disks 52 and 54. Balls 56 are disposed within recesses 49 and 50 and constitute the connection by which the drive member 46 rotates the disks 52 and 54. Each disk 52, 54 has a lamination 58 of friction material secured by rivets 59 to the disk and is engageable with surface 60 of plate 24 and surface 62 of the plate 26 during the brake application, the friction material being however normally out of engagement with faces 60 and 62 by reason of retraction spring 64 which urges the disks away from the plates.

Each disk has a transverse flange 66 which is cylindrical in shape and provides a braking surface for a surrounding band 68 which is made up in two halves 70 and 72 each including friction material lining 74 with laterally spaced arcuate sectors 76 engageable with the cylindrical flanges 66 of the disks 52 and 54. The two band halves 70, 72 have ends 80 which are wrapped over sleeves 30 for pivotal movement on the sleeves 30 which act as anchors for the friction band as it constricts inwardly.

The two halves of the brake band are fastened at their ends 82 to a toggle actuator 84 having links 86 pivotally connected with both the ends 82 and a draw rod 88 which extends through a rubber boot 90 and is gripped by the boot 90 at 92. The relative stiffness of the boot is sufficient to support the rod but permits sufficient downward movement of the rod to release the brake band following each brake application.

In operation, the rod 88 is pulled upwardly by a mechanical linkage (not shown) which is operated by a foot pedal or hand lever accessible to the driver. Should the wheel of the tractor be turning, this will be accompanied by rotation by the jack shaft 42 and the driving member 46 which is splined to the shaft 42, also effects rotation of the disk members 52 and 54 which are driven by the drive member 46 through the balls 56. The band 70, 72 when constricted inwardly to engage flanges 66 of the disks 52, 54, retards rotation of the disks 52, 54 relatively to the drive member 46 thereby causing the cam balls 56 to move upwardly on the ramp recesses 49, 50 and spread the disks in opposite directions to engage their linings 58 with faces 60 and 62 of the nonrotatable plates 24, 26.

The anchoring force of the bands is sustained by the two sleeves 30 at the bottom of the brake as shown in FIGURE 1. The braking action occurs over several distinct braking surfaces, provided by the disks and the bands respectively so that there is appreciable swept surface area thereby precluding overheating of any one particular area of the brake. The band halves 70, 72 during brake application are not biased laterally (either to the right or to the left, FIGURE 4) because that lining sector 76 which engages the flange of disk 52 and thereby tends to move laterally with the disk 52 is offset by an equal biasing effect from engagement with disk 54 which tends to move in a direction opposite that of disk 52. There is therefore a slight tendency for the cylindrical surfaces of the flanges 66 of the disks to slide relatively to the band 68 but, as explained, this will not have the effect of biasing the band proper in one lateral direction or the other because the biasing effects are equal and opposed. There is considerable advantage to retarding lateral movement of the disks since it tends to reduce the rate of application of the disk members against plates 24 and 26 so that when the brake is initially applied, there is less force of impingement of the lining against plates 24, 26 and a consequent reduction in the incidence of brake noise. Likewise, there is no shifting either circumferentially or laterally of the band and hence less possibility of noise occurring from that source.

Because the brake includes a band construction and camming balls 56 which can be provided with any preferred ramp angle for the recesses 49, 50, the brake is surprisingly effective because of self-energization both from the band and from the camming balls 56; the result is that the brake is suitable for installation at the wheel of the tractor because of its inherent effectiveness but is not necessarily located there as indicated from the description.

When the brake is released, the applying pull rod is lowered to the position shown in FIGURE 1 thereby retracting lining 76 of the band halves and the spring 64 urges the disks away from plates 24 and 26 so that the disks are once again rotated through the drive member 46 and synchronously therewith through the balls 56.

The friction material 74 on the band halves 70, 72 incorporates a groove to straddle the split disks. The lining is also chamfered at its outer edge to prevent wear ridges from developing at the corners of the disk's outer diameters (FIGURE 3).

While the present invention has been described in connection with a single example embodiment of the invention, it will be understood that this is only illustrative of the invention and is in no sense restrictive thereof. It is intended therefore that such variations and revisions of the present invention as may be expected on the part of those skilled in the art to meet individual design preferences, will be included within the scope of the following claims as equivalents of the invention.

What is claimed is:

1. A disk brake or the like comprising a casing having spaced braking surfaces, a rotatable shaft received through said casing, a pair of disks encircling said shaft, a friction member carried by each disk and engageable in face contact with a respective one of said surfaces, spring means urging said disks toward each other to positions with said friction members clear of said surfaces, a disk driving means secured at its inner periphery to said shaft and extending radially therefrom to provide surfaces located between said disks, camming means operatively connected to each disk and said disk driving means for spreading said disks in opposite directions upon a differential of rotation between said disks and said disk driving means to effect engagement of said friction members with their respective braking surfaces, a member adjacent a peripheral portion of both of said disks for simultaneously frictionally engaging the outer peripheral surfaces thereof, and means for engaging said last named member with said outer peripheral surfaces of both of said disk.

2. The structure as recited in claim 1 wherein said spring means include two coil compression springs surrounding said shaft and each having one end engageable on the face of one of said disks opposite its respective braking surface and the other end operatively connected to shaft at a location away from said one end of said coil spring and away from the other of said disks.

3. The structure as recited in claim 1 wherein said last named means comprises linkage means.

4. The structure as recited in claim 1 wherein the surface of said last named member engaging the outer peripheral surfaces of said disks is generally parallel to each of the outer peripheral surfaces of said disks.

5. A disk brake or the like comprising a casing having spaced braking surfaces, a rotatable shaft received through said casing, a pair of disks encircling said shaft, a frictional member carried by each disk and engageable in face contact with a respective one of said surfaces, spring means urging said disks toward each other to positions with said friction members clear of said surfaces, a disk driving means secured at its inner periphery to said shaft and extending radially therefrom to provide surfaces located between said disks, camming means operatively connected to each disk and said disk driving means for spreading said disks in opposite directions upon a differential of rotation between said disks and said disk driving means to effect engagement of said friction members with their respective braking surfaces, a brake band adjacent a peripheral portion of both of said disks for frictionally engaging the outer peripheral surfaces thereof, and means for constricting said band for frictional engagement with the outer peripheral surface of said disks.

6. The structure as recited in claim 5 wherein the surface of said band engaging the outer peripheral surfaces of said disks is generally parallel to each of said peripheral surfaces.

References Cited in the file of this patent

UNITED STATES PATENTS

| | | |
|---|---|---|
| 1,088,248 | Via | Feb. 24, 1914 |
| 1,122,933 | Hufford | Dec. 29, 1914 |
| 1,673,509 | Heisler | June 12, 1928 |
| 2,344,933 | Lombert | Mar. 21, 1944 |
| 2,807,172 | Jacobs | Sept. 24, 1957 |
| 2,864,468 | Dombeck | Dec. 16, 1958 |
| 2,955,680 | Caero | Oct. 11, 1960 |

UNITED STATES PATENT OFFICE
CERTIFICATE OF CORRECTION

Patent No. 3,139,955 July 7, 1964

Edward K. Dombeck

It is hereby certified that error appears in the above numbered patent requiring correction and that the said Letters Patent should read as corrected below.

Column 2, line 34, for "recess" read -- recesses --.

Signed and sealed this 2nd day of March 1965.

(SEAL)
Attest:

ERNEST W. SWIDER
Attesting Officer

EDWARD J. BRENNER
Commissioner of Patents